Feb. 23, 1954
S. E. REES
2,669,887
COUNTERSINKING APPARATUS
Filed Aug. 17, 1950
4 Sheets-Sheet 1
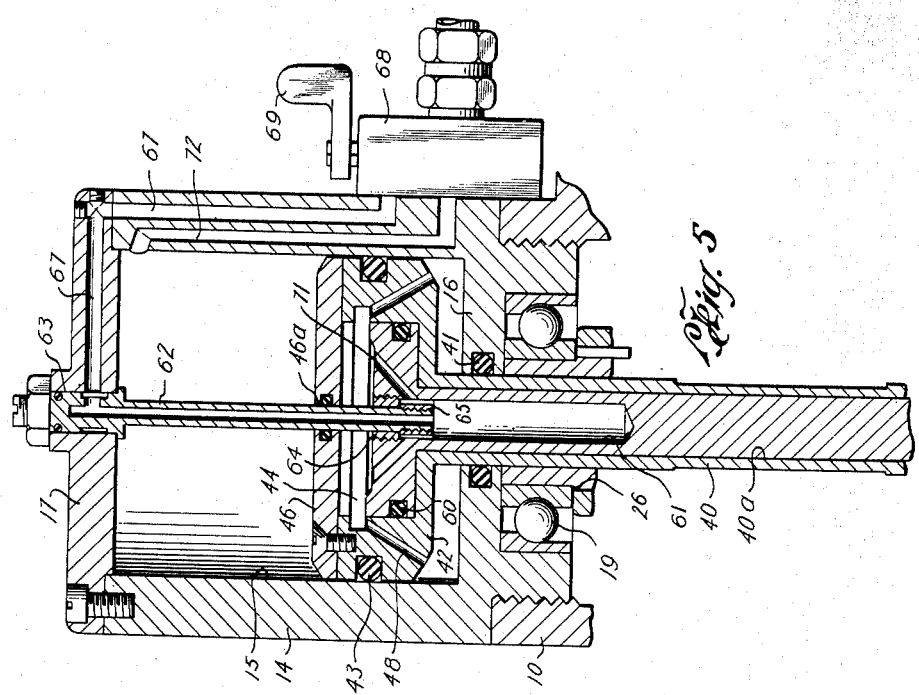
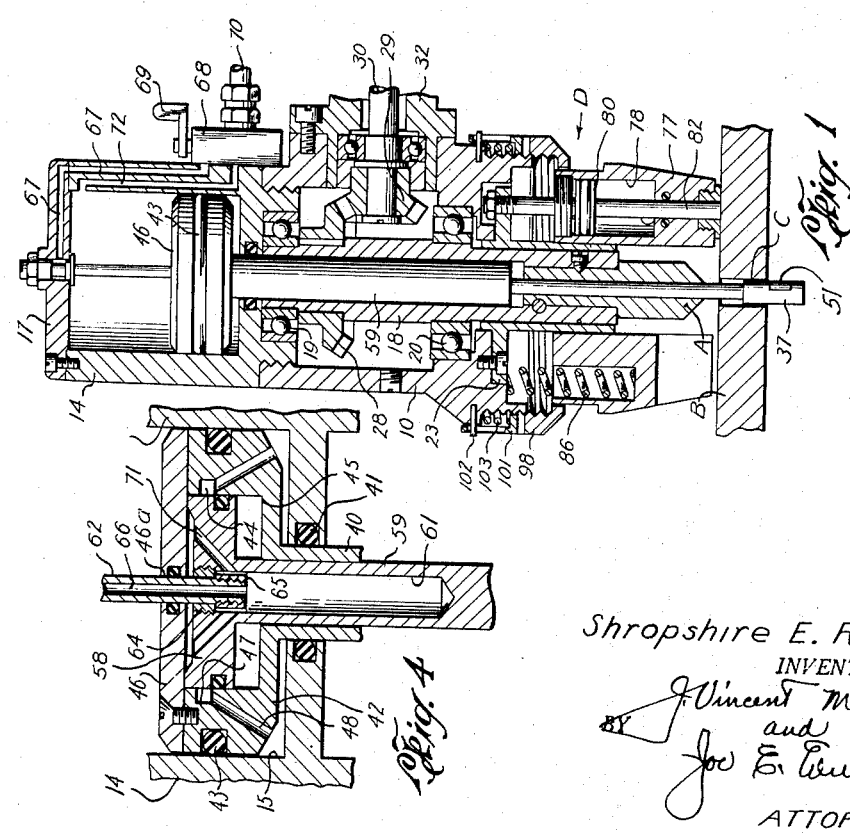
Shropshire E. Rees
INVENTOR.
BY J. Vincent Martin
and
Joe E. Edwards
ATTORNEYS Feb. 23, 1954  S. E. REES  2,669,887
COUNTERSINKING APPARATUS
Filed Aug. 17, 1950  4 Sheets-Sheet 2
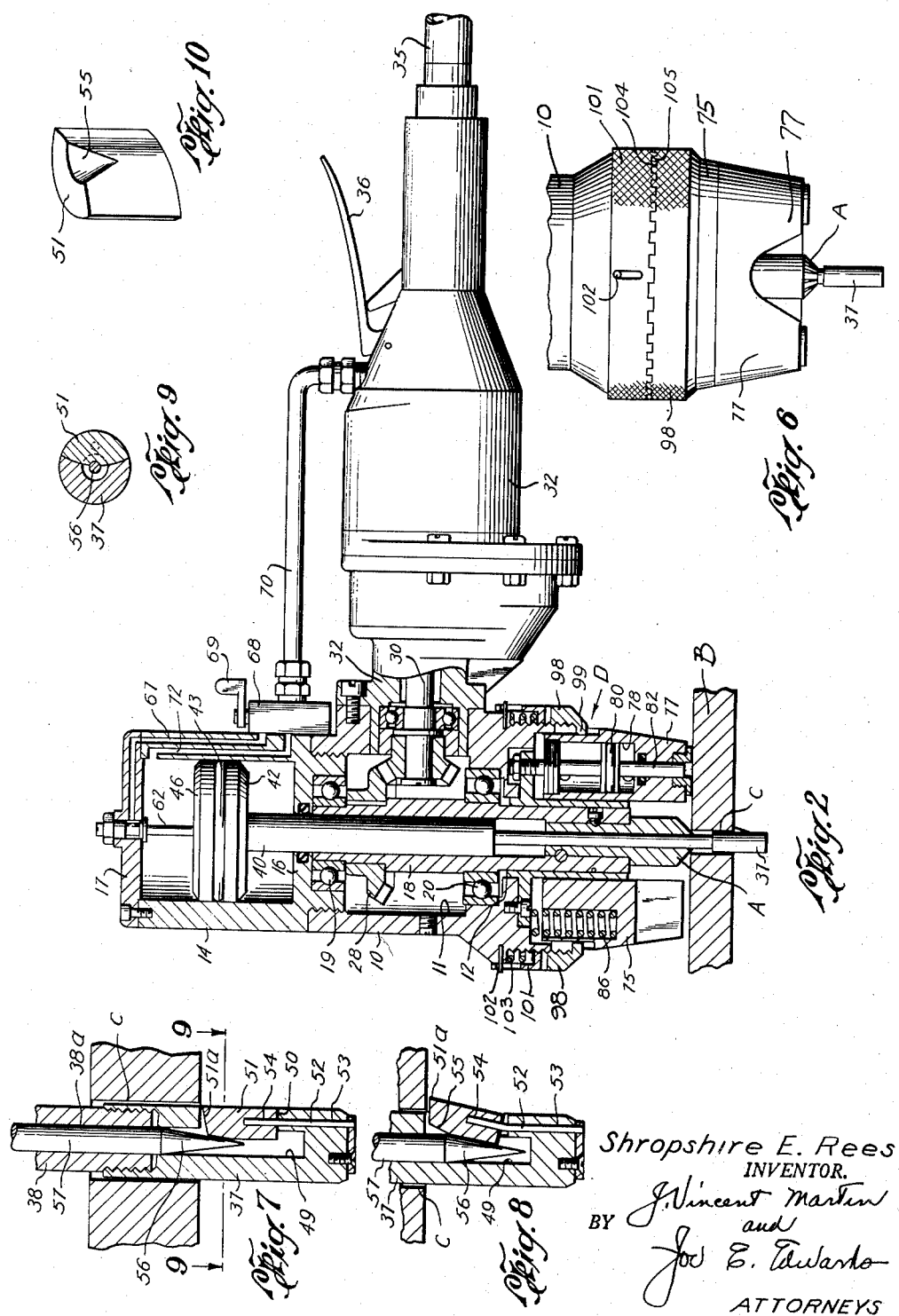
Shropshire E. Rees
INVENTOR.
BY J. Vincent Martin
and
Joe E. Edwards
ATTORNEYS

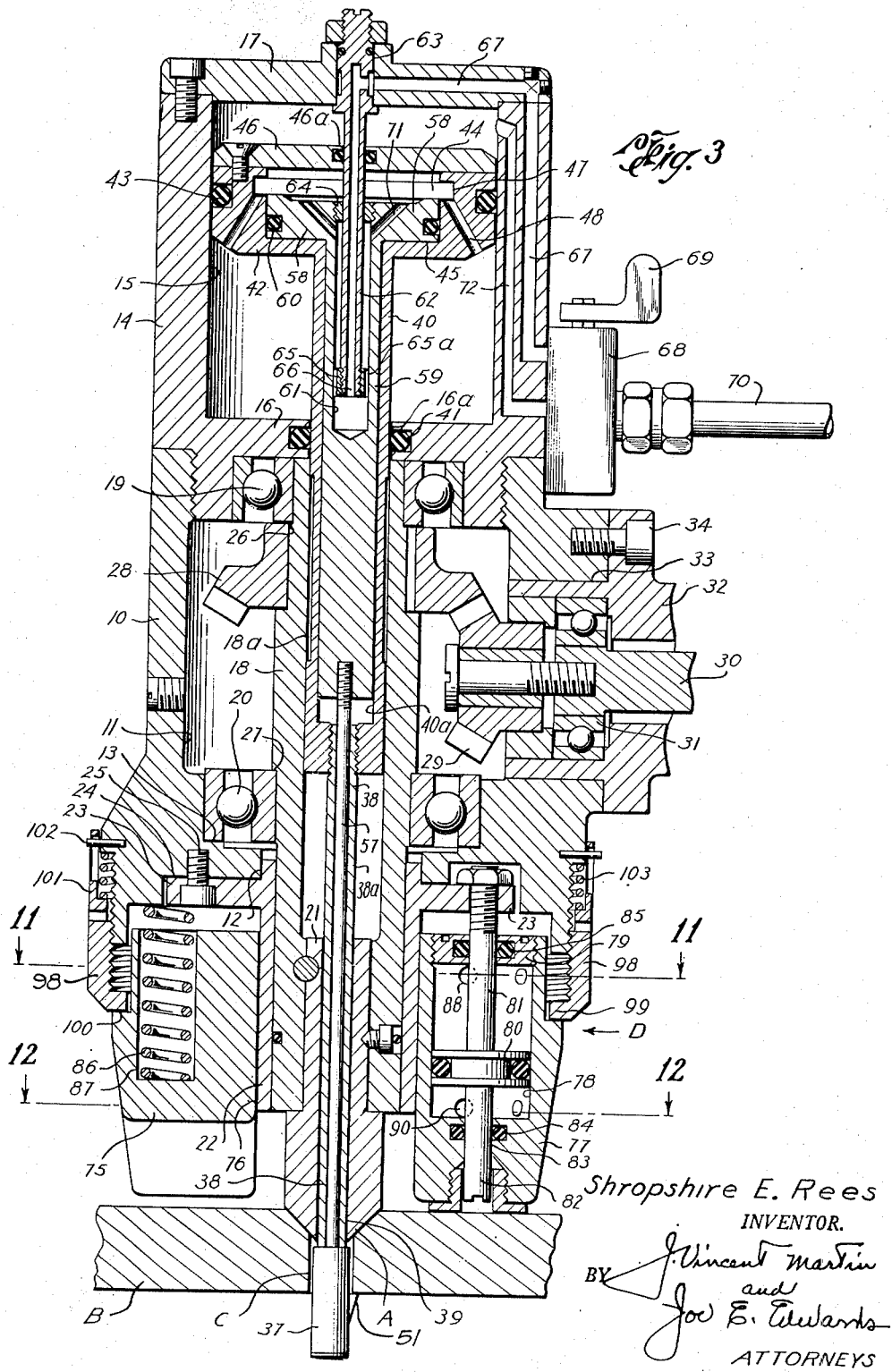

Feb. 23, 1954  S. E. REES  2,669,887
COUNTERSINKING APPARATUS
Filed Aug. 17, 1950
4 Sheets-Sheet 4
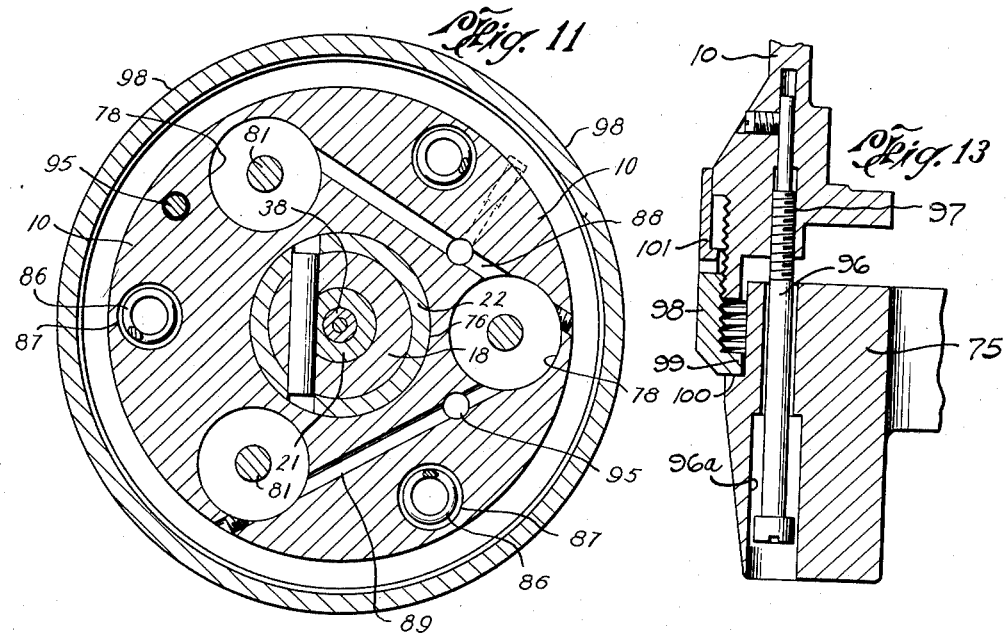
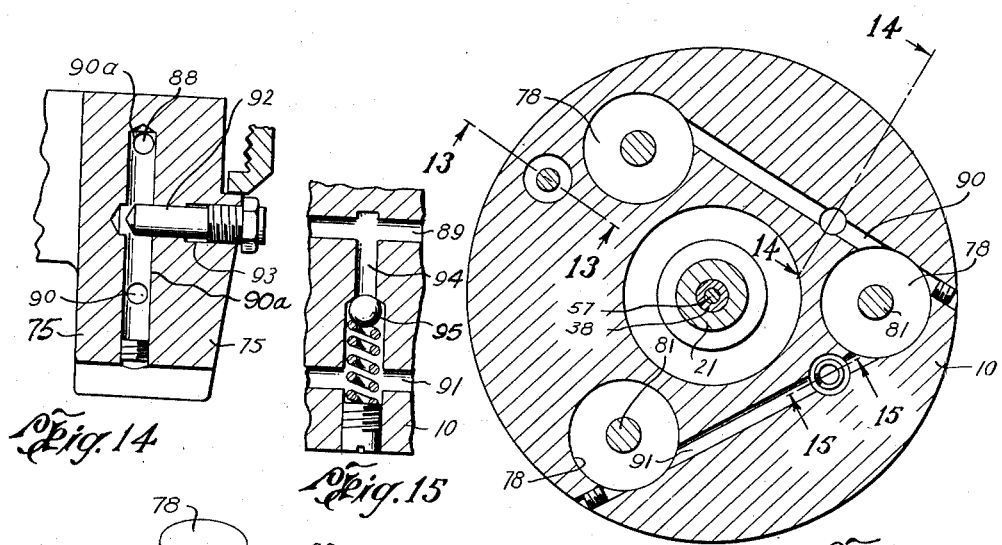
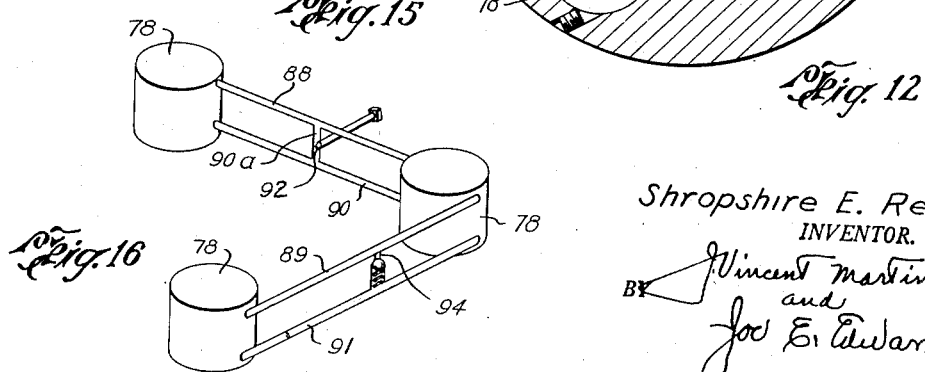
Shropshire E. Rees
INVENTOR.
BY Vincent Martin
and
Joe E. Edwards
ATTORNEYS Patented Feb. 23, 1954

2,669,887

UNITED STATES PATENT OFFICE 2,669,887

COUNTERSINKING APPARATUS

Shropshire E. Rees, Houston, Tex., assignor to Reed Roller Bit Company, Houston, Tex., a corporation of Texas Application August 17, 1950, Serial No. 179,908

15 Claims. (Cl. 77—2)

This invention relates to new and useful improvements in countersinking apparatus.

One object of the invention is to provide an improved apparatus for countersinking openings or holes in a plate, sheet or other member and which is particularly adaptable for use in accurately countersinking openings in aluminum plates or sheets employed in aircraft manufacture.

An important object of the invention is to provide an improved pneumatically-operated apparatus having means for maintaining the countersinking cutter in axial alignment with the opening being countersunk and also for accurately controlling the depth of the countersinking operation.

Another object is to provide an improved countersinking apparatus having means for locating and locking the plate or member being countersunk in proper position relative to the countersinking cutter, with said locking means functioning to form a rigid support for the member during the countersinking operation, whereby accuracy of the operation is assured.

A further object of the invention is to provide an apparatus of the character described, wherein the countersinking tool or cutter is mechanically and automatically controlled and is engaged with and fed into the work to perform the countersinking at a controlled rate of feed; the means for controlling the rate of feed being readily adjustable to adapt the apparatus to any type of countersinking operation in accordance with the size of opening being countersunk and the material being worked upon.

Still another object of the invention is to provide an improved pneumatic tool for countersinking an opening in a plate member having means engageable with the side of the member opposite that in which the countersink is formed, whereby said means forms a backing or support for the member during the countersinking operation; the engagement and disengagement of said means being accomplished automatically and being synchronized with the movement and operation of the countersinking tool, whereby the countersinking operation may be accurately carried out in a minimum length of time.

A still further object is to provide an apparatus, of the character described, which includes an improved centering assembly for accurately maintaining the cutter in axial alignment throughout the countersinking operation; said centering assembly also functioning to control the rate of feed of the tool to the work, as well as the depth of cut of the tool, whereby the construction of the tool is simplified.

A particular object is to provide an improved duplex piston arrangement for an apparatus, of the character described, with one of the pistons being connected to the locking means which engages and supports the work during the countersinking operation and the second piston being secured to the countersinking tool; operation of the pistons and the coaction therebetween controlling actuation of the locking means and movement of the tool in the necessary and desired sequence.

The construction designed to carry out the invention will be hereinafter described together with other features thereof.

The invention will be more readily understood from a reading of the following specification and by reference to the accompanying drawings forming a part thereof, wherein an example of the invention is shown, and wherein:

Figure 1 is a vertical sectional view of a countersinking apparatus, constructed in accordance with the invention and illustrating the parts in a position at the beginning of the countersinking operation, Figure 2 is a view similar to Figure 1 and illustrating the drive mechanism for imparting rotation to the cutter and showing the cutter in a position engaging the work and just prior to rotation, Figure 3 is an enlarged vertical sectional view of the apparatus showing the position of the parts at the completion of the countersinking operation, Figure 4 is an enlarged sectional detail of the duplex piston arrangement, with the pistons in position just prior to beginning the countersinking operation, Figure 5 is an enlarged sectional detail of the piston arrangement with the pistons in a position just prior to final unlocking and disengagement of the tool from the work, Figure 6 is a partial elevation of the lower portion of the apparatus illustrating the centering assembly and adjustment of the limiting means, Figure 7 is an enlarged longitudinal sectional view of the lower portion of the guide member and showing the locking element in a retracted position, Figure 8 is a similar view with the locking element in expanded position in engagement with the work piece, Figure 9 is an enlarged horizontal cross-sectional view taken on the line 9—9 of Figure 7, Figure 10 is an isometric view of the locking element, Figure 11 is a horizontal cross-sectional view taken on the line 11—11 of Figure 3, Figure 12 is a horizontal cross-sectional view taken on the line 12—12 of Figure 3, Figure 13 is a vertical sectional view taken on the line 13—13 of Figure 12, Figure 14 is a vertical sectional view taken on the line 14—14 of Figure 12, Figure 15 is a vertical sectional view taken on the line 15—15 of Figure 12, and Figure 16 is a diagrammatic view of the hydraulic system of the centering assembly.

In the drawings the numeral 10 designates a main housing or casing which is generally cylindrical and which is formed with a bore 11 and a counterbore 12, an annular shoulder 13 being provided between the bore and counterbore. The upper end of the housing has a cylinder 14 secured thereto and projecting upwardly therefrom, and it is preferable that the cylinder have substantially the same external diameter as the housing. The cylinder has a bore 15 which has its lower end closed by a transverse partition 16 and which has its upper end closed by a suitable cover plate 17 which is bolted or otherwise secured in position on the cylinder.

A countersinking tool or cutter A is adapted to be mounted axially within the housing, and, as will be explained, may undergo a rotative movement with respect thereto. The cutter assembly, as shown in Figure 3, includes a tubular drive shaft 18 which extends axially of the housing 10, and the upper end of the drive shaft is mounted in suitable bearings 19 with the intermediate portion of the shaft being mounted within bearings 20. The lower portion of the shaft 18 has the shank 21 of the countersinking cutter secured thereto. The upper portion of the drive shaft 18 extends through the bore 11 of the housing 10 while the lower portion projects downwardly through the counterbore 12. A sleeve 22 surrounds the lower portion of the drive shaft and has its upper portion engaged within the counterbore 12; this sleeve is provided with an external flange 23 which engages within an annular recess 24 in the lower end of the housing and the flange is secured to the housing by bolts 25. The sleeve 22 thus forms a bearing for the lower portion of the drive shaft. External shoulders 26 and 27 are formed on the drive shaft adjacent the bearings 19 and 20 whereby the drive shaft is incapable of axial movement with respect to the housing but may be rotated relative thereto.

For imparting a rotation to the drive shaft 18, a beveled gear 28 is keyed to the upper portion of the drive shaft within the upper portion of the housing 10, and this gear is in constant mesh with a drive pinion 29 secured on the end of an operating shaft 30. The drive shaft 30 is mounted in suitable bearings 31 located in one end of a casing 32 which is secured within a radial opening 33 formed in the housing 10. The casing 32 is fastened by bolts 34 to the housing and said casing, as clearly shown in Figure 2, projects radially from one side of the housing. This casing houses suitable pneumatic mechanism (not shown) which is air operated to impart rotation to the drive pinion 29. An air conduit 35 has connection with the casing and a suitable control lever 36 controls actuation of the pneumatic drive mechanism to control rotation of the drive pinion 29.

It will be evident that when the pneumatic drive mechanism is operated by means of the control lever 36, the pinion 29 is rotated and through its engagement with the gear 28 a rotation is imparted to the drive shaft 18. Because the countersinking cutter A is secured to the lower end of the drive shaft it will be obvious that rotation of the drive shaft will impart a rotation to the cutter. Thus, when the cutter is engaged with a plate member or work piece B and subsequently rotated, a countersinking operation will be performed on the upper portion of an opening C (Figure 3) which extends through said plate member or work piece.

In the countersinking of an opening such as C which extends through a plate member, it is necessary that the countersinking cutter A be guided or axially aligned with the opening to assure accurate countersinking. It is also desirable that the rate of feed of the countersinking cutter into the material, as well as the depth of the cut of said cutter, be controlled. In addition, the member being countersunk should be reinforced or braced on the side opposite that on which the countersinking operation is being carried out. All of these factors, namely, supporting of the work piece, axial alignment of the cutter and control of the rate of feed and depth of cut, are essential to efficient and accurate countersinking.

For the purpose of guiding and axially aligning the cutter A with respect to the opening C and also for the purpose of bracing or backing up the member being worked upon, a guide member and locking assembly is provided. This assembly includes a tubular mandrel or member 37 which is adapted to project forwardly of the cutter A in axial alignment therewith. The tubular mandrel or member 37 has an external diameter substantially equal or slightly less than the opening C which is to be countersunk and its upper end is secured to a tubular rod 38 which extends upwardly through an axial opening 39 which is formed in the cutter A and the shank 21 of said cutter. The upper end of the tubular rod 38 is threaded into the bottom of an elongate piston rod 40 and said piston rod extends upwardly through the bore 18a of the drive shaft 18 and also through an opening 16a formed axially of the partition 16 which extends across the bottom of the cylinder 14. A suitable packing 41 packs off around the piston rod 40, and said rod is slidable axially within the drive shaft; at the same time, the tubular connector 38 which connects the piston rod 40 with the guide mandrel 37 is slidable through the cutter A.

The upper end of the piston rod 40 has connection with an outer piston 42 which is reciprocable within the bore 15 of the cylinder 14. As is clearly shown in Figure 3 the piston 42 has an external diameter substantially the same as the diameter of the bore 15 and has a suitable packing ring 43 mounted in its external surface and engaging the wall of the bore of the cylinder. The piston 42 is also formed with an internal chamber 44 having a substantially flat bottom 45. The upper end of this chamber is closed by a closure plate 46 which is secured by suitable screws to the body portion of the piston. Within the upper portion of the chamber 44 an annular groove or recess 47 is provided in the wall of said chamber, and this annular passage communicates with the bore of the cylinder below the piston through a plurality of inclined passages 48. The purpose of the chamber 44, groove 47 and passages 48 will be hereinafter described in detail.

From the foregoing, it will be seen that the countersinking cutter A is mounted within the housing 10 and may be rotated through the drive pinion 29 and drive gear 28 to impart a rotation to the cutter. The guide mandrel 37 is connected directly with the piston rod 40 and with the piston 42, and upon a relative movement of the piston with respect to the housing the tubular guide mandrel or member 37 which projects forwardly of the cutter A may undergo a longitudinal movement with respect to the cutter and to the housing.

The tubular mandrel or member 37 is clearly shown in Figures 7 to 9 and is formed with an axial bore 49 extending entirely therethrough and communicating with the bore 38a of the tubular connecting element 38. A radial opening 50 which is generally arcuate in cross-section is cut in the wall of the mandrel or member 37, and a locking element 51 is movable within this opening. The locking member 51 is shown in Figures 8 and 9 and has an external surface formed on the same radius as the external surface of the mandrel. The locking member is secured within the opening 50, as shown in Figure 7, by means of a spring wire 52 which projects upwardly through an opening 53 provided in the mandrel and the upper end of this wire is fastened within a recess 54 in the element. The spring wire 52 normally exerts its pressure to retain the locking element or block 51 in its inner position, and in such position the outer surface of the locking element forms a continuation of the external surface of the mandrel.

For moving the locking element or block 51 outwardly to the position shown in Figure 8, the inner upper surface of the element or block is formed with an inclined surface 55 which is adapted to coact with the tapered lower end 56 of an actuator rod or bar 57. This actuator bar extends axially through the bore 38a of the tubular connector 38 and when said bar is in a raised position with respect to the locking element or block 51, as illustrated in Figure 7, the block is in its inner position, being held so by the spring wire 52. Upon a downward movement of the actuator rod 57 with respect to the locking element or block 51, the tapered lower end of the actuator coacts with the inclined surface 55 of the block to cause an outward swinging of the upper end of said block to the position shown in Figure 8. This moves the outer surface of the upper portion of the locking element or block outwardly with respect to the external surface of the guide mandrel 37 and thereby increases the effective external diameter of the mandrel at this point. The upper end of the locking element or block 51 may be inclined or tapered as indicated at 51a to facilitate the swinging movement.

In the operation of the guide mandrel 37 and the locking element 51, the mandrel is passed through the opening C in the member or work piece B so as to locate the locking element 51 on that side of the member B which is opposite to the side which is to be countersunk. When the locking block is so located the actuator 57 is moved with respect to the locking block, and this causes an outward swinging of the block whereby the upper end 51a of the locking block abuts or is adjacent to the surface of the work piece or member B. So long as the locking block or element 51 remains in an expanded position it will be evident that a retraction of the mandrel through the opening C is prevented. This locking of the mandrel 37 to the member or work piece B axially aligns and maintains the alignment of the cutter A with the opening C. Also, because the upper surface 51a of the locking element 51 is arcuate, the block presents an amplified surface which contacts the member B and functions as a backing or support when the subsequent countersinking operation begins.

For controlling the operation of the actuator rod 57 an inner piston 58 is provided. This piston is connected through a piston rod 59 with the upper end of the actuator rod 57 which rod extends axially from the upper end of the tubular connector 38 and into the bore 40a of the outer piston rod. The inner piston 58 is mounted to undergo limited movement within the chamber 44 of the outer piston 42 and is, of course, provided with an external packing ring 60. The upper portion of the piston rod 59 is bored out as indicated at 61, and a tubular conductor 62 has its lower portion extending into this bore. The upper portion of the conductor 62 is suitably secured in a fixed position within an opening 63 in the cover plate 17 of the cylinder. The tubular conductor extends through an axial opening 46a in the cover plate 46 of the outer piston 42, downwardly through the chamber 44 and through a collar 64 secured in the upper end of the bore 61 of the inner piston 58 and its rod 59. The extreme lower end of the conductor 62 has a stop collar 65 threaded thereon and this collar is adapted to be engaged by the collar 64 which is carried by the inner piston, as will be explained.

The tubular conductor 62 has a bore 66 having an open lower end communicating with the lower portion of the bore 61 of the inner piston rod 59. The upper end of the bore 66 communicates with an angular passage 67 which extends through the cover plate 17 and the wall of the cylinder 14. The other end of the passage 67 is connected through a control valve 68 having a suitable hand control lever 69, and said valve controls the admission of air under pressure from an air line 70 which is, of course, suitably connected to the valve. When the valve 68 is in a position permitting flow of air from the conduit 70 to the passage 67, air under pressure flows through the passage and then downwardly through the bore 66 of the tubular conductor 62 and into the bore 61 of the inner piston rod 59. From this point the air under pressure passes the stop collar 65 through external recesses 65a provided in said collar and flows upwardly through the bore 61. From the bore this air under pressure passes through an inclined port 71 which is provided in the inner piston 58, and thus, air is conducted into the chamber. If the inner piston 58 is in its raised position with respect to the outer piston 42, as illustrated in Figure 4, this air under pressure will act upon the inner piston in the space between said inner piston and the cover plate 46 and will function to move the inner piston 58 downwardly relative to the outer piston 42, whereby the annular groove 47 in the upper portion of the chamber is uncovered. The downward movement of the inner piston 58 with respect to the outer piston 42 results in a longitudinal movement of the actuator rod 57 which has connection with the inner piston relative to the locking block 51 which is carried by the guide mandrel 37; the guide mandrel 37 is secured through the connector 38 with the outer piston rod 40, and it is thus obvious that the initial movement of the inner piston downwardly in the chamber relative to the outer piston will cause an expansion of the locking element 51.

Following the relative movement of the inner piston 58 with respect to the outer piston 42, the uncovering of the groove 47 within the chamber 44 will permit air under pressure to pass downwardly through the ports 48 into the bore of the cylinder between the outer piston 42 and the partition 16 which closes the end of the cylinder. This air under pressure will tend to move the outer piston 42 toward the cover plate 17 but since the outer piston is directly connected through the piston rod 40 or connector 38 with the mandrel 37 which is locked against withdrawal through the opening by the locking block, the outer piston is immovable. The admission of the air into the space between the piston 42 and the partition 16 will therefore result in forcing the cylinder 14 and the entire housing assembly downwardly with respect to the outer piston. Because the countersinking cutter A is directly mounted in and forms a part of the housing, the admission of air below the outer piston 42 will move the cutter downwardly into contact with the plate or member B. As the housing is moved in a direction toward the plate member or work piece B the area between the outer piston 42 and the cover plate 17 of the cylinder is vented through an angular opening 72 which extends from the upper end of the bore of the cylinder 14 to the air control valve 68.

From the foregoing, it will be evident that the guide mandrel 37 is first engaged through the opening C which is to be countersunk and the locking element or block 51 is then actuated to engage that side of the member which is opposite the side which is to be countersunk. At this time, the cutter A is spaced upwardly from the opening. As explained, the locking block is expanded by the movement of the inner piston relative to the outer piston and thereafter the air is introduced into the space between the outer piston and the end partition 16 of the cylinder. The introduction of air into this area functions to move the entire housing which carries the cutter downwardly into engagement with the member to be countersunk, and at this point the control lever 36 which controls the rotative movement of the countersinking cutter is actuated to impart rotation to the cutter. As will hereinafter appear the feed of the cutter continues while the cutter is rotating to control the depth to which the countersinking operation will extend. Also, as will be explained, the rate of feed of the countersinking cutter is controlled as the opening C is countersunk.

For controlling the rate of feed of the cutter A to the work and also for controlling the depth of the countersinking cut, as well as for maintaining true axial alignment of the cutter throughout the operation, an aligning and control assembly generally indicated at D is provided on the lower end of the housing 10. The assembly D includes a generally cylindrical shaped body 75 which has an axial opening 76 surrounding the sleeve member 22 which, as explained, is bolted to the lower portion of the housing 10. The lower portion of the body has a trio of extended portions which provide downwardly directed extensions or foot pieces 77. Aligned with each extension or foot piece 77 is a cylinder 78 formed in the body and extending downwardly from its upper end. The upper end of each cylinder is closed by a closure plate 79 threaded into the cylinder 78. Each cylinder has a piston 80 therein and this piston is supported by a piston rod 81 which is secured to the extended annular flange 23 of the sleeve member 22 (Figure 3). The lower end of each piston 22 has a guide rod 82 which projects through an axial opening 83 in each extension or foot piece 77. Suitable packing rings 84 and 85 seal off around the guide rod 82 and the piston supporting rod 81. For normally urging the body 75 and the foot pieces 77 which form a part thereof downwardly with respect to the housing 10 a plurality of coil springs 86 are disposed between the lower end of the housing and the body, it being preferable that each spring be retained within a recess 87 in the body.

The upper ends of the cylinders 78 are connected by passages 88 and 89, while the lower ends of the cylinders are connected by passages 90 and 91 (Figure 16). The passages 88 and 89 have connection through a vertical passage 90a in which a metering valve 92 is mounted. The metering valve is disposed within a lateral opening 93 provided in the wall of the body 75, and the adjustment of this valve will control the flow of fluid thereby. The passages 89 and 91 are connected by a vertical passage 94 which is provided with a spring-pressed check valve 95.

The three cylinders 78 are completely filled with hydraulic fluid which, of course, is present on both sides of the pistons 80. The coil springs 86 are normally urging the body 75 having the foot pieces 77 in a direction away from the body 10, which means that the foot pieces 77 are in an extended position with the pistons 80 in the upper portions of their respective cylinders 78. Extension of the body 75 and complete displacement therefrom is limited by an elongate headed bolt 96 (Figure 13) which extends through a counterbored passage 96a in the body 75 and which is threaded into an opening 97 provided in the lower end of the housing 10. When the foot pieces 77 are engaged with the work or plate member B and air pressure is applied to move the housing downwardly, a downward force is applied to each of the pistons 80 since these pistons are secured to the housing. Since each piston is movable within one of the cylinders 78 it will be apparent that the downward force on the housing will tend to cause an inward movement of the body 75 which carries the foot pieces inwardly of the housing. The rate of movement of the foot pieces and body will, of course, be controlled by the by-pass of the hydraulic fluid from below the pistons 80 through the passages 90 and 91, and then through the vertical passage 90a to the upper passages 88 and 89. Since the metering valve 92 is mounted in the vertical passage 90a it is evident that the rate of flow by-passing from the lower end of each piston to its upper end is controlled. Thus, the rate of movement of the foot pieces 77 and body 75 inwardly of the housing is controlled, and this in turn controls the rate of feed of the cutter A into the work. It is also noted that because the foot pieces are located equidistant around the cutter they provide three points of contact with the work piece which assures the maintenance of accurate alignment of the cutter with the opening.

Upon retraction or disengagement of the cutter from the work after the countersinking operation is complete the springs 86 will again move the body 75 and the foot pieces outwardly of the housing 10 and in order to permit a fairly rapid movement in this direction the check valve 95 in the vertical passage 94 opens, which allows a fairly rapid flow from the upper passages 88 and 89 downwardly through the passage 94 past this check valve and into passages 90 and 91 which extend to the lower end of the cylinders 78.

For controlling the amount of movement of the body 75 and foot pieces 77 inwardly of the housing to thereby control the depth of the cut made by the countersinking tool A, an adjusting collar 98 is threaded onto the lower end of the housing. This collar is provided with an inwardly directed annular flange 99 which is adapted to be engaged by an annular shoulder 100 formed on the body 75. It will be evident that by rotating the stop or limiting collar 98 the amount of inward movement of the foot pieces 77 with respect to the housing upon downward movement of the housing is controlled. In order to lock the limiting or stop collar 98 in its adjusted position a serrated lock ring 101 is slidably mounted on pins 102 on the lower end of the body, and this ring is constantly urged toward the stop collar by a coil spring 103. The lower edge of the lock ring is serrated at 104 (Figure 6) and these serrations are adapted to engage serrations 105 provided on the upper edge of the stop or limiting collar to thereby lock said collar in adjusted positions.

The operation of the device is believed obvious from the foregoing. Initially the parts are in the position shown in Figure 1 in which position the aligning and control assembly D has its foot pieces extended with respect to the housing 10, being urged to this position by the coil springs 86. The duplex piston arrangement comprising the outer piston 42 and the inner piston 58 is in the position shown in Figures 1 and 4, and in such position the actuator rod 57 is raised with respect to the locking element or block 51. The outer piston 42 is nearer the closed end or partition 16 of the cylinder.

The operator engages the extending guide mandrel 37 with the opening C in the plate member B so as to locate the locking block 51 on that side of the member which is opposite the side to be countersunk. The air control valve 68 is then operated by its control lever 69 to direct air under pressure from the conduit 70 through the angular passage 67, downwardly through the tubular conductor 62, then through the bore 61 and passage 71 into the upper end of the chamber 44. This air under pressure will act upon the inner and outer pistons in a manner to move the inner piston 58 from its position in Figure 4 covering the annular groove 47 to the position shown in Figure 3. This movement of the piston moves the actuator rod 57 with respect to the locking block 51 to swing the locking block outwardly and thereafter prevent retraction of the guide mandrel 37 from the opening C.

As the annular groove 47 is uncovered due to the movement of the inner piston 58 with respect to the outer piston 42, the air under pressure is directed through passages 48 in the outer piston into the space between the outer piston and the end partition 16 of the cylinder. This air tends to move the piston 42 upwardly but since the outer piston is directly connected to the mandrel which has been locked against displacement from the opening C the air pressure functions to move the entire housing assembly downwardly with respect to the stationary piston assembly.

As the housing assembly moves downwardly the cutter A which is attached thereto is fed downwardly to the plate member B and the rate of movement is controlled by the metering valve 92 in the hydraulic system of the assembly D. As the cutter A moves into contact with the work the operating lever 36 (Figure 2) is actuated to impart a rotation to the drive shaft 18 and to the cutter. The air pressure acting against the housing continues to urge the cutter into the work and the rate of feed is continued to be controlled by the movement of he body 75 as controlled by the hydraulic system. The countersinking operation continues until the shoulder 100 on the body 75 of the assembly D strikes the inwardly directed flange 99 of the stop or limiting collar which has been previously adjusted. At this point further inward movement of the cutter A with respect to the member B is halted and thus the depth of the countersinking operation is accurately controlled.

At this time, rotation of the cutter A is halted and the air valve 68 is moved to its opposite position which vents the passage 67 to atmosphere and directs air under pressure to the passage 72 into the space between the outer piston 42 and the cover plate 17. This air pressure results in a relative movement between the housing and the piston 42 which causes the piston to move toward the end partition 16. As the piston approaches the partition and reaches the position shown in Figure 5 the collar 64 within the inner piston 58 engages the stop collar 65 on the tubular conductor 62 to stop the simultaneous travel of the inner piston with respect to the outer piston. Continued movement of the outer piston 42 within the cylinder results in the inner piston again returning to the position shown in Figure 4. Such relative movement of the two pistons causes a retraction of the locking block 51 because the actuator bar 57 moves upwardly relative thereto. The parts have thus returned to their original position, the air control valve 68 is closed, and the device is ready for the next operation.

From the foregoing, it will be seen that an apparatus is provided which will effectively align the countersinking tool, maintain such alignment and control the rate of feed as well as the depth of the countersinking cut. The locking of the guide mandrel to the plate provides for backing up the plate on the side opposite that on which the countersinking is effected.

The foregoing disclosure and description of the invention is illustrative and explanatory thereof and various changes in the size, shape and materials, as well as in the details of the illustrated construction may be made, within the scope of the appended claims, without departing from the spirit of the invention.

Having described the invention, I claim:

1. A countersinking apparatus for countersinking an opening extending through a work piece and including a housing, a countersinking cutter rotatably mounted on the lower portion of the housing, a hollow cylindrical guide member having an axially closed end portion extending axially of the cutter in advance thereof and adapted to project through the opening in the work piece, a latch mounted in the side of the guide member near the closed end portion thereof and engageable with that side of the work piece opposite the side to be countersunk for locking the guide member against withdrawal from the opening, and an actuator in the interior of said guide member mounted for limited movement with respect thereto and toward the closed end portion thereof for actuating said latch into locking position.

2. A countersinking apparatus for countersinking an opening extending through a work piece and including a housing, a rotatable countersinking cutter mounted on the lower portion of the housing, a guide member extending axially in advance of the cutter and adapted to project through the opening in the work piece, locking means mounted on the guide member and engageable with that side of the work piece opposite the side to be countersunk for locking the guide member against withdrawal from the opening, an aligning assembly mounted on the lower portion of the housing for engaging the work piece to maintain axial alignment of the countersinking cutter with respect to the opening being countersunk upon movement of the cutter into contact with the work piece, said aligning assembly including a plurality of hydraulic cylinders having pistons therein, and means for controlling the by-pass of hydraulic fluid around said pistons to control the rate of movement of the housing and cutter into contact with the work piece.

3. A countersinking apparatus as set forth in claim 2, including an adjustable stop means for limiting the movement of the hydraulic cylinders of the centering assembly.

4. A countersinking apparatus for countersinking an opening extending through a plate element and including, a housing having a cylinder in its upper portion, a countersinking cutter rotatably mounted on the lower portion of the housing, a guide member extending axially through the cutter and housing with one end thereof projecting axially in advance of the cutter and its opposite end extending into the cylinder, a piston connected to the end of the guide member, locking means mounted on the projecting end of the guide member and engageable with that side of the plate element opposite the side to be countersunk for locking the guide member against withdrawal from the opening in said element, an actuator extending axially through the guide member, a piston secured to the inner end of the actuator, and means for directing air to the cylinder in a manner to control the movement of the actuator with respect to the locking means and to control the movement of the housing having the rotatable cutter thereon with respect to the guide member.

5. An apparatus as set forth in claim 4, wherein the piston having connection with the actuator may undergo a limited movement with respect to the piston secured to the guide member and also wherein the position of the piston secured to the actuator with respect to the piston of the guide member controls the direction of movement of the housing relative to the guide member.

6. An apparatus as set forth in claim 4, together with means for controlling the rate of movement of the housing with respect to the guide member when movement is imparted to said housing.

7. An apparatus as set forth in claim 4, together with a centering assembly mounted on the lower portion of the housing and including, a plurality of movable cylinders spaced around the cutter with the lower ends of said cylinders engageable with the element through which the opening to be countersunk extends, and hydraulic means for controlling the movement of said cylinders to thereby control the rate of movement of the cutter with respect to the element.

8. An apparatus as set forth in claim 4, together with a centering assembly mounted on the lower portion of the housing and including, a plurality of movable cylinders spaced around the cutter with the lower ends of said cylinders engageable with the element through which the opening to be countersunk extends, hydraulic means for controlling the movement of said cylinders to thereby control the rate of movement of the cutter with respect to the element, and means mounted on the housing and coacting with the movable cylinders for limiting the extent of movement of said cylinders.

9. An apparatus for countersinking an opening extending through a flat plate and including, a housing, a countersinking cutter mounted on the lower portion of the housing, a guide member extending axially in advance of the cutter and adapted to project through the opening in the work piece, means on the guide member for locking said member against withdrawal from the opening, a cylinder within the housing having the guide member extending thereinto, a piston secured to the end of the guide member within the cylinder, and means for introducing pressure fluid within the cylinder between one end of the cylinder and one side of the piston, whereby the piston is held stationary through the means locking the guide member to the plate to thereby effect a movement of the housing with respect to the guide member and to the plate to move the cutter into engagement with the plate.

10. An apparatus as set forth in claim 9, together with manually controlled means for rotating the cutter after it engages the plate member to perform a countersinking operation.

11. An apparatus as set forth in claim 9, together with manually controlled means for rotating the cutter after it engages the plate member to perform a countersinking operation, and means for reversing the application of pressure fluid within the cylinder to effect movement of the housing with respect to the guide member in an opposite direction to disengage the cutter from the plate.

12. An apparatus as set forth in claim 9, together with means mounted on the housing for controlling the rate of movement of the housing with respect to the guide member and plate.

13. An apparatus as set forth in claim 9, together with means mounted on the housing for controlling the rate of movement of the housing with respect to the guide member and plate, and adjustable means for limiting the movement of the housing with respect to the guide member and plate to thereby control the depth of the cut made by the countersinking cutter.

14. A countersinking apparatus for countersinking an opening extending through a work piece and including a housing, a rotatable countersinking cutter mounted on the lower portion of the housing, a locking member extending axially in advance of the cutter and adapted to project through the opening in the work piece for engagement with that side of the work piece opposite the side to be countersunk for locking said housing and cutter against withdrawal from said work piece, a hydraulic cylinder mounted on the lower end portion of said housing having a piston therein contacting said work piece, and means for controlling the by-pass of hydraulic fluid around said piston to control the rate of movement of the housing and cutter into contact with the work piece.

15. A countersinking apparatus for countersinking an opening extending through a work piece and including a housing, a countersinking cutter rotatably mounted on the lower portion of the housing, a hollow cylindrical guide member having a closed end extending axially of the cutter in advance thereof and adapted to project through the opening of the work piece, a radial opening in the wall of said guide member adjacent the closed end thereof, a latch mounted in said opening movable outwardly for engagement with that side of the work piece opposite the side to be countersunk for locking the guide member against withdrawal from the opening, spring means fastening said latch to said guide member and normally maintaining the latch inwardly into inoperative position, and an actuator axially in said guide member and mounted for limited movement with respect thereto for moving said latch outwardly.

SHROPSHIRE E. REES.

References Cited in the file of this patent

UNITED STATES PATENTS

| Number | Name | Date |
|---|---|---|
| 1,964,023 | Armstrong | June 26, 1934 |
| 2,466,745 | Seamans | Apr. 12, 1949 |
| 2,479,660 | Wright | Aug. 23, 1949 |

FOREIGN PATENTS

| Number | Country | Date |
|---|---|---|
| 648,221 | Germany | July 26, 1937 |